Jan. 22, 1946.　　　C. W. GRONCY　　　2,393,502
SPREADING APPARATUS
Filed Oct. 26, 1943

Inventor
CARL W. GRONCY
By Ely & Frye
Attorneys

Patented Jan. 22, 1946

2,393,502

UNITED STATES PATENT OFFICE 2,393,502

SPREADING APPARATUS

Carl W. Groncy, Akron, Ohio, assignor to The Firestone Tire & Rubber Company, Akron, Ohio, a corporation of Ohio Application October 26, 1943, Serial No. 507,747

2 Claims. (Cl. 91—30)

This invention relates to spreading apparatus, and more especially it relates to improved apparatus for the continuous spreading of a layer or layers of viscous composition upon a moving support.

The invention is especially applicable in the rubber industry for the spreading of viscous unvulcanized rubber compositions, which composition subsequently is subjected to vulcanization, and it may be employed with natural or artificial aqueous dispersions of rubber, synthetic rubber, or rubber dissolved in volatile solvents. The invention may be employed for producing continuous sheet rubber in which case the moving support will be an endless conveyor belt of metal or other material to which the viscous rubber composition does not adhere and from which it subsequently may be removed, or, that may be employed for applying a rubber coating to fabric, such as tire building fabric, that subsequently is cut into plies for incorporation in a tire casing during fabrication of the latter.

The conventional method of spreading viscous compositions is to position a scraper blade above the moving support, and to maintain a bank of the viscous material upon the support behind said scraper blade. The scraper blade is adjustable as to elevation, and by varying the distance of the blade from the support, the thickness of the layer of composition on the latter is controlled. The method is not entirely satisfactory, especially in situations where it is desired to control the thickness of the applied composition to a nicety, due to the fact that the thickness of the applied composition varies, and also differs from the spacing of the edge of the scraper blade above the support. Experience has shown that the thickness of the applied composition is affected by the hydrostatic pressure of the bank of material back of the scraper blade, and by non-uniformity of the thickness of said bank, and it is to the relief of these conditions that this invention primarily is directed.

The chief objects of the invention are to obtain a product of uniform and exact thickness; and to provide improved apparatus for accomplishing the foregoing object. More specifically the invention aims to provide an improved spreading apparatus of the character mentioned wherein the thickness of the applied composition is not affected by the hydrostatic pressure of a bank of material back of a scraper blade. Other objects will be manifest as the description proceeds.

Figure 1:
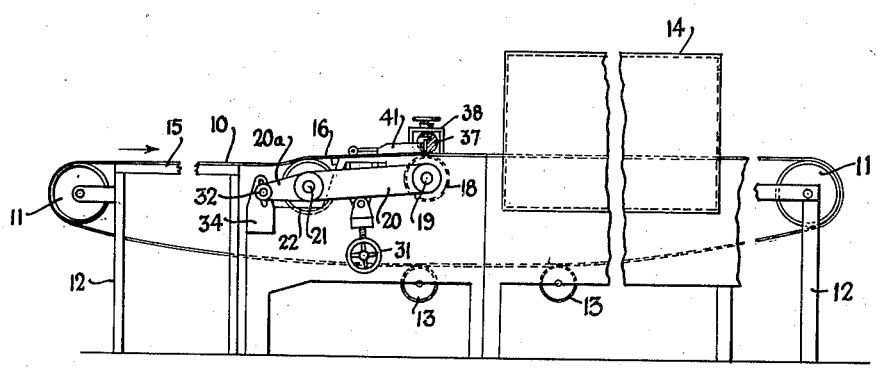
Figure 2:
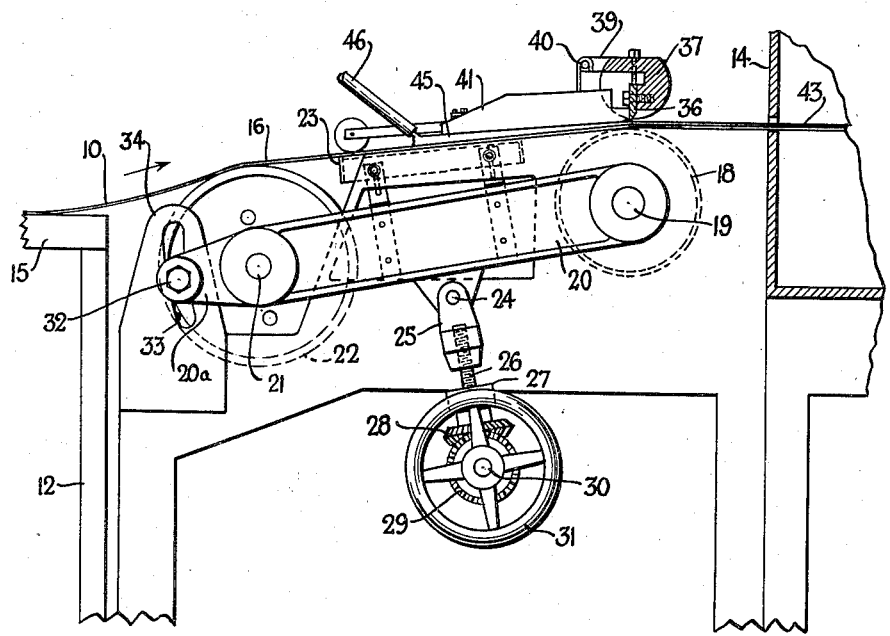

Of the accompanying drawing:

Fig. 1 is a somewhat diagrammatic side elevation of apparatus embodying and adapted for the practise of the invention; and Fig. 2 is an elevational detail, on a larger scale, of a portion of the apparatus shown in Fig. 1, parts thereof being in section.

For illustrative purposes, and not in a limiting sense, the invention is depicted in its application to apparatus for forming sheet material composed of rubber, such as rubber latex. As shown in Fig. 1 of the drawing, said apparatus comprises an endless conveyor belt 10 of aluminum or other suitable metal, or waxed material to which the rubber composition will not strongly adhere, said belt being trained about a pair of pulleys 11, 11, at least one of which is power driven so as to impel the belt in the direction indicated by the arrow. The pulleys 11 are carried by a suitable framework 12 that also carries a plurality of rollers 13, 13 that support the lower reach of the belt. At one region of its course the upper reach of the belt 10 passes through a housing or oven 14 that is heated by steam coils (not shown) or by other suitable means for effecting gelation of latex deposited upon the belt. Under some circumstances the oven 14 may be of such length and heated to such temperature as to effect vulcanization of the latex. As shown, the oven 14 is located adjacent one end of the upper reach of the conveyor, which is the right hand end thereof as shown in Fig. 1. At the left hand end of the conveyor a portion of the upper reach thereof is supported upon a flat table or surface 15 at the top of the framework 10. A salient feature of the invention is the arrangement whereof the portion of the upper reach of the conveyor that is supported upon surface 15 is disposed in a lower horizontal plane than the portion of the upper reach of the conveyor that is within the oven 14 and extending to the right hand end of the conveyor, there being a local region of the belt, intermediate said offset planes, that is obliquely disposed or inclined. The inclined portion of the conveyor is designated 16 in the drawing, the arrangement being such that the conveyor moves up the inclined plane as it traverses its course.

The conveyor is supported in its inclined region 16, and means is provided for varying its angle of inclination. To this end a supporting roller 18 is positioned beneath the conveyor adjacent the receiving end of the oven 14, said roller being journaled on a fixed shaft 19. Pivotally mounted upon the shaft 19, at opposite ends thereof, is a pair of arms, such as the arm 20, and carried by said arms, adjacent the free ends thereof, is a shaft 21 upon which a roller 22 is journaled, the latter supporting the conveyor near the lower end of its inclined region 16. Carried by the arms 20, intermediate the rollers 18, 22, is a flat plate or table 23 that engages the under side of the conveyor and constitutes a firm support for the medial portion of the inclined region thereof, said table being adjustable relatively of the arms 20. Each arm 20 is pivotally connected at 24 to a clevis-like member 25 that has a screw member 26 threaded therethrough, said screw member being journaled in a fixed bearing 27, and having its lower end provided with a bevel gear 28. The latter mesh with respective bevel gears, such as the gear 29, that are mounted upon a fixedly positioned shaft 30, and the latter is provided, at one end thereof, with a hand-wheel 31 by means of which it may be rotated. Thus by the manual turning of the hand-wheel 31, the angular position of the arms 20 about the shaft 19 concurrently may be varied. The free end of each arm 20 is formed with an extension 20a that carries a bolt 32, the latter extending through an arcuate slot 33 formed in a stationary plate 34, the said slot being concentric with the axis of shaft 19. The arrangement is such that by the tightening of bolts 32 the arms 20 may be secured in any position of adjustment.

For spreading viscous composition upon the conveyor 10, a scraper blade 36 is employed, which blade extends transversely of the belt, in a vertical plane, directly over the roller 18 at the upper end of the inclined region 16 of the conveyor. The scraper blade 36 is carried by a supporting beam 37, and the latter is supported for vertical adjustment, toward and away from the conveyor, by suitable brackets at opposite sides of the conveyor, such as the bracket 38, Fig. 1. On the side of the beam 37 toward which the conveyor moves, said beam is provided, at each end thereof, with laterally projecting ears such as the ear 39, Fig. 2, and each of said ears carries a short cylindrical bar 40 that is disposed horizontally and parallel to said beam. Suspended from bars 40 at opposite ends of the beam 37 are guide plates 41 which obstruct lateral flow of the bank of viscous composition on the conveyor 10 and assure that there will be smooth, straight margins on the layer of material spread upon the conveyor by the scraper blade. The said layer of material is shown at 43, Fig. 2.

The bank of viscous composition from which the layer 43 is formed is shown at 45, Fig. 2. Said bank is the result of the continuous flow of composition onto the conveyor from a delivery nozzle 46 disposed above the conveyor and having communication with a suitable source of supply of the composition (not shown). Preferably the nozzle 46 is positioned somewhat in front of that side of the scraper blade 36 toward which the upper reach of the conveyor moves. Also it is preferred that the nozzle be impelled back and forth transversely of the conveyor to assure more even transverse distribution of the bank of composition 45.

In the operation of the apparatus, the conveyor 10 is continuously driven in the direction indicated by the arrows, and viscous composition is continuously deposited on the conveyor from the nozzle 46. The moving conveyor 10 carries the composition deposited thereon toward the scraper blade 36, but because the region on which the composition is deposited is disposed on an inclined plane, there is a concurrent counterflow of composition in the direction opposite to that in which the conveyor is moving. The angularity of the inclined region 16 of the conveyor, the speed of the conveyor, and the rate of flow of composition from the nozzle 46 are properly coordinated with the spacing of the scraper blade 36 above the conveyor, with the result that the bank of composition 45 is thickest at a point remote from the scraper blade 36, and at the latter is but slightly thicker than the space between the blade and the conveyor. Said space determines the thickness of the layer spread upon the conveyor posterior to the scraper blade, and such thickness may be controlled to a nicety due to the absence of hydrostatic pressure of a bank of composition against the anterior side of the scraper blade. Furthermore, by discharging the viscous composition onto the conveyor at a point relatively remote from the scraper blade, the material has ample time to spread out before reaching the scraper blade, so that the bank of composition is of substantially uniform thickness upon reaching said blade. Because of the control of the bank of material 45 as described, the layer 43 spread on the conveyor is of uniform thickness transversely of the conveyor. Immediately after passing under the scraper blade the conveyor enters a horizontal region of its travel, so that there is no counterflow of the layer 43, whereby the determinate thickness of the latter is maintained.

The layer 43 moves with the conveyor through the oven 14 where it is gelled and/or dried. The layer may be vulcanized in the oven if desired, the nature of the treatment in the oven being governed by the temperature therein and the time required for the conveyor to pass therethrough. At the delivery end of the apparatus (at the right thereof as shown in Fig. 1) the layer 43 may be stripped from the conveyor and disposed of in any desired manner.

The invention provides in a simple and facile manner for the production of sheet material of uniform and exact gauge, and achieves the other advantages set out in the foregoing statement of objects.

Modification may be resorted to without departing from the spirit of the invention or the scope thereof as defined by the appended claims, which are not limited wholly to the specific construction shown.

What is claimed is:

1. Spreading apparatus comprising an endless moving support having a local region of one reach thereof disposed in an inclined plane up which the support moves and a horizontal region therebeyond, a fixedly positioned shaft beneath the support, a supporting roller on said shaft engaging said support at the upper end of said inclined plane, a scraper blade operatively associated with said endless support above said supporting roller, a pair of parallel arms journaled on said fixed shaft, a supporting roller carried at the free ends of said arms engaging the support at a lower elevation of the inclined plane than the first mentioned roller, and means for concurrently adjusting the angular position of said arms about their pivot to vary the angle of the inclined portion of the endless support with relation to the horizontal portion thereof.

2. Spreading apparatus comprising an endless moving support having a local region of one reach thereof disposed in an inclined plane up which the support moves and a horizontal region therebeyond, a fixedly positioned shaft beneath the support, a supporting roller on said shaft engaging said support at the juncture of the inclined and horizontal regions thereof, a scraper blade operatively associated with said endless support above said supporting roller, a pair of parallel arms journaled on said fixed shaft, a supporting roller carried at the free ends of said arms engaging the support at a lower elevation of the inclined plane than the first mentioned roller, a table structure mounted upon said parallel arms and engaging the inclined portion of the moving support to provide a firm backing for the same between the two rollers aforementioned, and means for concurrently adjusting the angular position of said arms about their pivot to alter the angle of the inclined portion of the endless support with relation to the horizontal portion thereof.

CARL W. GRONCY.